United States Patent [19]

Cummings

[11] 4,022,946
[45] May 10, 1977

[54] METHOD FOR COATING WET SURFACES OR SURFACES IMMERSED IN WATER

[75] Inventor: Lowell O. Cummings, San Anselmo, Calif.

[73] Assignee: PVO International Inc., San Francisco, Calif.

[22] Filed: Nov. 20, 1975

[21] Appl. No.: 633,864

Related U.S. Application Data

[60] Continuation of Ser. No. 408,454, Oct. 23, 1973, abandoned, which is a division of Ser. No. 196,778, Nov. 8, 1971, which is a continuation-in-part of Ser. No. 157,638, June 28, 1971, abandoned.

[52] U.S. Cl. .............................. 428/413; 427/386; 428/418
[51] Int. Cl.² ...................... B05D 7/14; B05D 7/24
[58] Field of Search .................... 427/386, 374 R; 260/2 N, 47 EN; 428/413, 538, 418

[56] References Cited

UNITED STATES PATENTS

| | | | |
|---|---|---|---|
| 2,872,428 | 2/1959 | Schroeder et al. | 260/29.2 EP |
| 2,909,448 | 10/1959 | Schroeder et al. | 260/29.2 EP |
| 3,160,518 | 12/1964 | Jorda | 428/418 X |
| 3,639,344 | 2/1972 | Kinneman | 260/47 EN |

FOREIGN PATENTS OR APPLICATIONS

| | | |
|---|---|---|
| 455,105 | 8/1965 | Switzerland |
| 806,196 | 12/1958 | United Kingdom |
| 1,216,136 | 12/1970 | United Kingdom |

*Primary Examiner*—James R. Hoffman
*Attorney, Agent, or Firm*—Owen, Wickersham & Erickson

[57] ABSTRACT

A system comprising an epoxy resin and a particular type of amine curing agent makes possible a method of applying a coating to a wet or moist surface, even to a surface under water. These amine curing agents are substantially insoluble in water and are not water sensitive. The curing agents of this method are chosen from (1) amines of the formula:

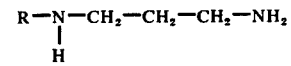

in which R is chosen from the group consisting of ether radicals of which one of the alkyl and alkylene radicals has at least eight carbon atoms or (2) a condensation product of a small proportion of a polyepoxide having a plurality of vic-epoxy groups and containing only members of the group consisting of carbon, hydrogen, oxygen and chlorine, and a larger proportion of a fatty amine of the formula:

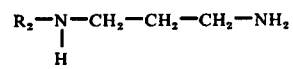

$R_2$ denoting a radical chosen from the group consisting of alkyl radicals having at least eight carbon atoms and ether radicals of which one of the alkyl or alkylene radicals has at least eight carbon atoms. Preferably the adduct of amine and epoxy resin is used as the curing agent for the main part of the epoxy resin. In one mode of procedure, the epoxy resin and the amine-resin adduct are each made into an aqueous emulsion; the emulsions, when mixed, are useful for application to a damp or wet surface.

14 Claims, No Drawings

METHOD FOR COATING WET SURFACES OR SURFACES IMMERSED IN WATER

CROSS-REFERENCE TO RELATED APPLICATION

This application is a continuation of Ser. No. 408,454 filed Oct. 23, 1973, and now abandoned which was a division of application Ser. No. 196,778, filed Nov. 8, 1971, which was a continuation-in-part of application Ser. No. 157,638, filed June 28, 1971 and now abandoned.

BACKGROUND OF THE INVENTION

This invention relates to a method of preparing an improved coating composition to a wet surface or object. The coating comprises a two-part system of an epoxy resin and any of a special group of amine curing agents. In one embodiment, in preparing a coating for application to a damp surface, the resin and an amine-epoxy resin adduct curing agent are separately made into water emulsions, the emulsions are then mixed together, and the admixture thereafter coated onto the substrate.

Two-part epoxy resin systems are well known as coatings for their outstanding adhesion to the substrates and for their toughness and chemical resistance. There are literally hundreds of such systems available which typically consist of part A, an epoxy resin, and part B, an amine-based compound. However, these prior-art systems are unable to obtain satisfactory results when coating a wet surface, for they do not adhere properly unless the surface is completely dry.

Robert M. Jorda described in U.S. Pat. No. 3,160,518 a process for applying a coating to surfaces immersed in water. In his process he used a coating comprising a polyepoxide and a considerable stoichiometric excess of a polyamine, the excess being at least 5% but more typically 50%. The excess was required because without it, the epoxy could not be completely cured and so could be washed away. It has now been determined that much, and in some cases even most, of the polyamine of Jorda dissolves in the water before it can react with the epoxy. How much will so dissolve depends on whether the water is agitated (e.g., if it is in a flowing stream or in the ocean near the surf), how soluble the particular amine is, the temperature of the water, the rapidity of the reaction between the amine and the epoxy and therefore how reactive the particular epoxy is, and so on. The finally reacted epoxy may be weakened or affected by retaining an excess of polyamine or may be weakened or affected by being deficient in polyamine, so that some of the epoxy resin is unreacted. The results are thus unpredictable, uncertain, unreliable. One can hardly know in advance all the affecting conditions well enough to be sure that he will have exactly the right degree of excess of polyamines to achieve whatever results are optimum for the particular epoxy and particular polyamine. Thus, Jorda did not solve the problem completely, however much improvement he may have achieved over what had been done before. And the Jorda process always wastes material, by using more amine that what is really needed for the reaction.

Some epoxy-amine materials (including some of the Jorda materials) are, moreover, water sensitive. Even when they have been fully reacted, when put in water or left in water, these materials may blister or change color, become opaque, tend to flake, or become soft.

SUMMARY OF THE INVENTION

I have now discovered superior coatings capable of application to wet surfaces and to application under water. My superior coatings do not require an excess of an amine, and they are reliable, giving predictable performances. The coating is applied as a liquid mixture of an epoxy resin with a curing agent chosen from (1) a certain class of amines, namely those in which the amine is of the following formula:

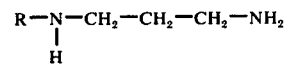

R denoting a radical chosen from the group consisting of ether radicals of which one of the alkyl or alkylene radicals has at least 8 carbon atoms or (2) a condensation product of a small proportion of a polyepoxide having a plurality of vic-epoxy groups and containing only members of the group consisting of carbon, hydrogen, oxygen, and chlorine and a larger portion of a fatty amine of the formula:

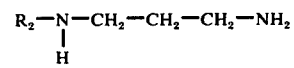

$R_2$ denoting a radical chosen from the group consisting of alkyl radicals having at least eight carbon atoms and ether radicals of which one of the alkyl or alkylene radicals has at least 8 carbon atoms. These amines and condensation products are all substantially water insoluble and are not significantly water sensitive. Slight amounts may dissolve in water without significantly affecting the results but significant water solubility cannot be tolerated. The liquid mixture can be an admixture of the epoxy resin in a liquid state and the amine in a liquid state, and such an admixture can be applied to moist or wet surfaces or to surfaces submerged under water. Alternatively, the liquid coating can be an admixture of an aqueous emulsion of the resin and an aqueous emulsion of an adduct of the epoxy resin and a fatty acid propylene diamine, such as a mixture as hereinafter described. The aqueous emulsion coating admixture is suitable for application to a moist or wet surface. The amine resin adducts described above form true aqueous emulsions, the nonaqueous particles of the emulsion being clearly visible under microscopic examination, the particles being generally about one micron in diameter and exhibiting the usual Brownian movement of emulsions of such particle size. The fatty amine adduct or condensation product should contain at least 25% by weight, based on total weight of the substance, of epoxy resin component, and up to about 55% thereof. Although fatty propylene diamine-epoxy resins in general tend strongly to form water-in-oil emulsions, apparently because of their strong polar cationic effect, those shown herein and those containing at least 25% of the epoxy resin component and made into aqueous emulsions by the method shown herein, form true oil-in-water emulsions as desired.

The mixture of epoxy resin component and amine curing agent component is agitated for some minutes before applying the coating. There are advantages in using a mixture of a fatty amine as described herein and a smaller amount of an epoxy resin as the amine curing agent, for those adducts have less amine odor, less allergenic reactivity, and parts A and B are more readily mixed. In either event the amine or amine-epoxy adduct is preferably used in a substantially stoichiometric amount.

A wide variety of epoxy resins can be used. The condensation products of bisphenol-A and epichlorohydrin can be used, but also all the epoxy resins described in Jorda's patent can be used in the process of the invention. In general one can say that the polyepoxide should have more than one vic-epoxy group and should contain only members of the group consisting of carbon, hydrogen, oxygen and chlorine.

A condensation product of a small proportion of a low-molecular-weight epoxy resin and a large proportion of a fatty amine of the given formula will also, as noted above, give an amine curing agent of this invention.

In the preparation of the aqueous amine-resin adduct epoxy resin system, the two components can be separately emulsified in the manner described below. Epoxy resins and also the fatty diamine adducts described herein as useful in this invention are viscous liquids, or semi-solid or solid substances and can be readily formed into the desired aqueous emulsions. In carrying out the process of this invention, a predetermined major amount of a water-insoluble epoxy resin or of an amine-epoxy resin adduct, suitably from about 70 to 95% by weight of the total of the initial ingredients, is charged to an emulsifying zone, into which is also fed a small amount of at least one emulsifier or emulsifying agent sufficient to effect stable emulsification of such water-insoluble component in water, in this process. Water essentially constitutes the remainder of the mix and is also charged to the mixing zone. The emulsifier can be added independently or pre-admixed with the water-insoluble component or with the water.

The emulsifiers useful herein are non-ionic. Advantageously, those used to emulsify the semi-solid and solid epoxy resins and the fatty amine-epoxy resin adducts are high cloud point resins, having a cloud point of over 200° F. Emulsifiers which have been found particularly useful in this invention are nonyl phenyl ethers commercially available under the following trade marks: Retzanol NP-300, containing 30 units of ethylene oxide, cloud point above 212° F.; Retzanol NP-500, containing 50 units of ethylene oxide, cloud point over 212° F.; Retzanol NP-15, of 15 units ethylene oxide, cloud point 203°–212° F.; Igepal CO 990, of 100 units ethylene oxide, cloud point over 212° F. The noted emulsifiers are effective at both higher and lower temperatures in the method of this invention. One or more of such emulsifiers can be employed. The emulsifier (as a non-volatile emulsifier based on non-volatile resin) can suitably be added in an amount of from about 5 to about 10%, or sufficient to maintain the emulsion state.

In a continuous manner of preparing a concentrated emulsion according to this invention and which is a water-insoluble liquid dispersed in a continuous water phase, a stream of that liquid and a stream of water are continuously fed to a mixing zone, mixed and then conducted to an emulsifying zone, to which an emulsifier is also charged. The water and emulsifier may be added as a solution of emulsifier in water. In that zone the components are subjected to a beating action simultaneously over a wide area of such admixture. Suitably, the beating action is effected by a planetary beater. It has been found essential to effect the beating action in such a manner in order, apparently, to drive layers of the water phase into the oil phase or water-insoluble liquid, forming a continuous membrane around very small dispersed droplets of the water-insoluble liquid. This enables continuous production of the desired concentrated emulsion, which can then be withdrawn continuously from the emulsifying zone to a dilution zone for dilution of the concentrate to the desired water content. The action of the beater results in particle sizes in the dispersed phase of not over 10 microns in diameter, usually from about 0.5 to 5 microns in diameter, the particle size being measured by microscopic examination, using a scale calibrated in microns.

The formation of a concentrate is an advantageous first step in making the final emulsion of this invention. This concentrate is an oil-in-water emulsion which has a general consistency and general appearance of the common mayonnaise found in food stores. The special rheological properties of the concentrate of this invention are due to particles of oil (or other water-insoluble liquid) which are surrounded by a thin layer of water or water solution. This configuration produces a strange behavior resembling that of mayonnaise. When the concentrate is undisturbed, it retains its general shape and does not tend to flow. It holds almost any shape it has been formed in. If an object is drawn over its surface, a track will be left, and the track will not flow back to give a smooth surface, even though the force needed to make the track is small. It does not yield or change shape until a certain small critical amount of force is reached, and then it yields more or less as it it were a Newtonian liquid. The force of gravity is not enough to cause flow, yet it is easily deformed. This type of behavior is called plastic flow. It is caused by more or less evenly sized particles, all of which are surrounded by a watery membrane. At rest, these particles fit together in layers in the same manner as is observed in stacked marbles or shot. When disturbed, the layers of particles slip over one another but then fit together again when undisturbed.

The melting points or pour points of semi-solid and solid resins approach the boiling point of water, and the emulsification is done on such resins at very hot water temperatures, i.e. such resins being heated to liquefaction and then added to a minor proportion, not over about 20% based on total weight of the mix, of hot water. These operating temperatures of close to the boiling point of water, e.g. of from about 180° to about 200° F., require an emulsifier which will be effective at those temperatures. Advantageously, the emulsifiers useful to emulsify the solid and semi-solid epoxy resins and fatty diamine-epoxy resin adducts are high-cloud-point resins having a cloud point of at least 200° F. The fatty monoamine-epoxy resin adducts emulsify rather readily by mechanical means.

The emulsion particles in the admixed emulsion coatings start to react or cure upon admixture, but the reaction is not completed for several hours. The course of this reaction is not understood completely at this time, and it is found upon microscopic examination that the particles in the mixed emulsion remain the same size all through the curing stage. The emulsion coating can be coated onto a substrate and curing completed or effected in the film so formed, the particles then being in contact with each other, or the emulsion coating can be coated onto the substrate at any time during the curing reaction period of several hours. At the end of the curing stage, the resin particles of the emulsion are hard, thermoset and very tiny. Alternatively to coating at once, the emulsion can be spray-dried to produce a powder coating. No hydrolysis of the epoxy groups of the epoxy resins have been noted, even after long standing of the aqueous emulsions.

Films formed using admixtures of the two emulsion components described herein are smooth and glossy. Pigments can be added to the emulsion, if desired. The films dry to a non-tacky film in a few hours and a tough film overnight, the film being very adherent to the substrate, having outstanding chemical resistance and, when used upon masonry, penetrating cracks and crevices to provide an excellent barrier. There is no problem of release of organic solvent because water is the only vehicle, so that there is no air pollution or flammability. The coatings can be used for waterproofing foundations, dams, bridges, tunnels, etc., and for coating walls, ceilings and floors of wet process industries such as meat processing, dairy and foods, pulp and paper, petrochemical and similar industries, and for coating walls and ceilings of institutional and industrial buildings such as hospitals, hotels, motels, schools, etc.

The substantially freshly made mixture of the unreacted epoxy resin and fatty amine curing agent may be applied to a damp or wet surface or in one embodiment to a surface immersed in water. The application can be done with a brush, a roller, or by spraying, even with a wet brush or a wet roller under water. After applying the mixture, the reaction between the epoxy resin and the amine agent takes place; the reaction occurs immediately, or substantially so, on the surface of the substance and then throughout the whole mixture, making a cured coating, which is bound directly to the substrate material.

All kinds of substrate material can be used, including iron, steel, other metals, wood, and masonry. The coating can be applied to wet or dry surfaces or in one method while the surfaces are immersed in water. The curing can take a time between 1 and 15 hours at room temperature for the coating to start hardening and between 5 and 20 hours at room temperature to cure fully. It is not necessary to dry a wet floor before the floor is coated. After about four hours, the coating is hard, and after about twenty hours the film cannot be peeled off with a knife. Besides this, the floor is then water repellent and has a dry "feel" when rubbed with a finger, even when under water. The use of a glycol in part A or B is optional, but it appears that the system cures faster and has better brushing properties when a glycol, such as propylene glycol, is used, where the coating is a mixture of liquid resin and liquid amine. Where the above-described emulsions are employed, it is advantageous to incorporate an emulsifier in the resin component.

It also appears that pigmented coatings apply and adhere better than clear coatings. When it is desired to use a pigmented coating, the pigment can be added either to part A or to part B, but, preferably, the pigment is added to part A, the epoxy-resin. For clear coatings, a mixture B is advantageously prepared by mixing a fatty amine in a large amount with a smaller amount of an epoxy resin and heating this mixture for about one hour to about 100° C., cooling it before using it as an amine curing agent in the two part system of the invention. The heating to 100° C. is not necessary, because the reaction will occur at room temperature and give some exothermic heat, but at a temperature of about 100° C. the reaction speed will be faster.

The same type of curing system can also be used to formulate a caulking compound which can be applied to damp or wet masonry and has a very good adhesion to wet concrete.

DETAILED DESCRIPTION

To contrast the invention with the prior art, examples are listed below in Table A, showing on the left conventional curing agents for epoxy resins, which, even if used in excess, nevertheless gave unsatisfactory results. On the right of Table A are listed some of the amine-curing agents used in the process of the invention, which can be used in substantially stoichiometric amounts and with which improved results are obtainable.

TABLE A

| Conventional amine-curing-agents for epoxy resins | Substantially water insoluble amine curing agents for epoxy resins of this invention |
|---|---|
| Polyamides made from dimer acids and ethylene diamine or higher homologs of ethylene diamine are water sensitive and are readily dispersed in water. | Condensation products of a low-molecular weight epoxy resin and a larger portion of fatty diamines of the structure $R-\underset{\underset{H}{\mid}}{N}-CH_2-CH_2-CH_2-NH_2$. |
| A condensation product of, for example, diethylene triamine and a low-molecular-weight epoxy resin to yield an amine curing agent with excess amino groups, is water sensitive and is readily dispersed in water. | The n-fatty propylene diamines mentioned above used by themselves, i.e. not condensed with epoxy resins. |

The amines, used in the method of the invention, have the unique property that they are able to coat damp or wet surfaces, apparently by displacing water from the surfaces. Yet water will not subsequently displace these amines from the surface, because these amines are water insoluble or substantially so. What happens is not completely certain, but it is believed that the amine groups in these molecules are more polar than water and act to displace water on a molecular basis, after which the amine groups actually can adhere directly to the surface on which the coating is to be formed.

The base of the invention is to use these N-fatty-propylene diamines as epoxy curing agents. It is visualized that in this new system, there are unreacted fatty amine groups initially in the epoxy resin-fatty amine mixture described. By epoxy resin here is usually meant the condensation product of bisphenol-A and epichlorohydrin, but other epoxy resins can also be used.

The mixture of the unreacted epoxy resin and fatty amine curing agent may be applied to a damp or water-wet surface. This surface can, among others, be composed of steel, masonry, or wood. The fatty amines displace the water from the surface and adhere themselves to the surface. They remain on the surface because they, as well as the epoxy resins, are water insoluble. Then the reaction between the epoxy resin and the fatty amine begins to take place, immediately on the surface of the substrate, and throughout the whole mixture, making a cured epoxy-amine coating which is bound directly to the substrate without an intervening water layer.

Another advantage of the epoxy system of this invention is that it can be formulated into a workable coating, without the use of organic thinners or solvents. The fatty amines are low viscosity materials, and they comprise a fairly large portion of the entire epoxy resin-amine mixture. Therefore, the mixture is low in viscosity and is easily applied as a coating. If desired, thinners or solvents can, of course, be used.

For best performance of the coating of this invention, the amine and the epoxy resin should be reacted in approximate stoichiometric quantities, that is, each amine hydrogen should react with one epoxy group. It is neither necessary nor advisible to use an excess of the amine, as Jorda indicated, although the invention can be worked in somewhat less ideal manner where either material is in excess, the material in excess just not reacting.

The epoxy resin-fatty amine system can be used in several ways to obtain a coating. Examples of these applications are:

1. Iron, steel, other metals, wood, masonry and other materials with a cleaned surface can be coated with the non-aqueous admixture of liquid resin and liquid amine as above described while these materials are submersed under water at all times. As in ordinary surface preparation for painting, it is preferred to clean the surface before application of the coating, as by brushing, sand-blasting and the like, so that surface dust and oil are removed. In this way, ship bottoms, marine pilings, and other underwater structures can be coated. The coating, which also can contain pigments, can be brushed on or rolled on with a paint roller or applied in other manners to almost any clean underwater surface. The mixture has the general consistency of a paint and can be used as such. A container containing the non-aqueous epoxy-amine mixed coating can be submersed under water, and a brush can be dipped in the can underwater, and the epoxy-amine coating can then be applied under water substantially as in applying it above water. The epoxy-amine coating preferentially adheres to the surface being coated, due to the stroking action of the brush. The coating is not displaced readily by any water-movement and will subsequently and spontaneously cure underwater to a tough, adherent, corrosion resistant film. The coating also performs excellently in sea water.

2. The same method can be followed to apply a coating to a partially submersed surface such as "splash zone" areas.

3. Damp, wet, or dry surfaces can be coated above water with either the non-aqueous or the aqueous epoxy resin-amine system. An important use of the epoxy resin-amine system of the invention is for coating masonry or metal surfaces which are or tend to be damp or are even wet with water. Of course, with the aqueous system of this invention, there should not be sufficient liquid water on the surface to dilute substantially the aqueous emulsion so that it disperses and does not spread on the substrate. It is well known that masonry surfaces are very hydrophilic; in fact, they always have a layer of water on them even though this layer of water may be only a few molecules thick. The same applies somewhat less to metals and wood. In conventional epoxy-amine coating systems, adhesion to damp surfaces is a problem. It is not a problem at all in the epoxy fatty amine system. An example of this use is coating damp concrete or brick floors, for concrete is almost always damp to some degree. In conventional preparation for applying an epoxy system the floor is cleaned very well with acids or detergents or both, and by scrubbing. Then the floor has to be dried carefully before the ordinary epoxy coating can be satisfactorily applied. This usually involves using a flame burner on the floor. Even this drying by flame only drives off the water for an inch or so below the surface, and the dampness in the lower concrete can re-penetrate the dried layer quickly by capillary action.

With the epoxy-fatty amine system of this invention there is no need of drying the floor. In fact, small puddles of water that may remain on the floor after cleaning need not be removed, especially with the non-aqueous system. The pigmented or clear epoxy-fatty amine is merely applied over all surfaces, water-wet or dry or damp. In a few minutes, the water "sweats out" through the coating and remains on top of the coating until it evaporates. The coating binds tenaciously to the substrate surface. It penetrates into microscopic cracks and crevices, displacing the water from them.

The following examples illustrate in greater detail the relative amounts in parts by weight of the components of compositions according to the invention and the use of these compositions.

EXAMPLE I

PREPARATION OF THE COATING MIXTURE

The following mixture, forming part A, is ground together on a paint mill:
 100 parts iron oxide pigment
 300 parts ground silica extender
 700 parts epoxy resin
 100 parts propylene glycol The epoxy resin is a low-molecular-weight liquid epoxy resin derived from bisphenol-A and epichlorohydrin. The equivalent weight per epoxy-unit is about 180. The viscosity is between 7,000 and 10,000 centipoise. This kind of epoxy resin is available under the trademark Araldite 6005 from CIBA-products Co. and under the trademark Epon 826, from Shell Chemical Co.

Part B is the reaction product of:
 5 parts N-oleyl propylene diamine and
 1 part of the above mentioned epoxy resin. The viscosity of part B is about 2 stokes, the Gardner color is 6 and it is a clear, transparent liquid.

The N-oleyl propylene diamine is of formula

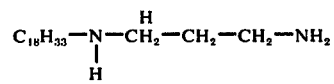

which has an amine number of about 320, an equivalent weight of about 175 as determined by the amine number, and an Iodine number of about 60. This amine is available as Duomeen O, from Armour Chemical Co. and as Adogen 572, from Ashland Chemical Co.

In part A the propylene glycol is optional. The system will function in all aspects very well without propylene glycol. However, it has been found that propylene glycol, or other glycols, given the benefit of a faster cure, better leveling films, better gloss, and better brushing properties. It also increases the water resistance of the film. Because the glycols cannot be extracted out of the cured film with water, it is believed that the glycols actually react with the epoxy resin to form ethers and thus become part of the film.

Before applying a coating to a wet surface, 1200 parts of A are mixed with 470 parts of B. This mixture of A and B has a ratio by weight of the epoxy resin to the fatty amine of 1 to 1. After a thorough mixing for 3 to 4 minutes, the coating can be brushed on a wet porous ceramic building brick, with a wet brush, or on an underwater surface of steel, wood or other materials.

EXAMPLE II

APPLYING THE COATING TO A DAMP OR WET SURFACE

A coating mixture, prepared as in Example I was applied by a wet brush to a porous, ceramic building brick, which had just previously been soaking in water. The coating applied was about 6 mils in thickness. In about three hours at room temperature the coating started to harden. After overnight curing at room temperature it was a very tough, glossy, adherent film, that could be scratched with a knife only with difficulty. The film, however, exhibited some degree of flexibility and bounciness.

The coated brick was then examined by breaking it with a chisel. A microscopic examination of the cross section of the coating-brick interface revealed that the epoxy-fatty amine coating had indeed penetrated all the cracks and holes of the water-saturated brick completely, even small cracks one-fourth inch deep. There were no uncoated surfaces.

EXAMPLE III

COATING STEEL UNDERWATER

The coating mixture of Example I was applied to a 4 by 12 inch 20-gauge steel test panel. Before being coated, the panel was submersed in a container one inch deep under water. The coating was applied easily with a brush by submersing the paint-filled brush under water and onto the panel. Brushing was smooth and easy, and a film of about 3 to 5 mils was applied quickly. It was rather smooth but did not exhibit as much leveling as observed when it was applied above water. The film on steel cured very well under water (55° to 60° F. during the cure time). It started to harden in about four hours and was a hard, cured, adherent film after 15 hours. The film could not be peeled off the steel in attempts to delaminate it with a knife. The film was water repellent and had a dry feel when rubbed with the finger underwater.

A similar test in sea water at 55° F. gave the same results.

It was noted that the steel panel did not rust even on uncoated areas near the edge of the coating. Evidently the fatty amine had formed a thin film on the steel near the edge of the film.

EXAMPLE IV

This is a comparison example in which an epoxy resinamine system has been prepared from conventional components. To illustrate the differences between the method of the invention and the results obtained by it and the method and results of a conventional coating system, the following amine curing systems were mixed with 1,200 parts A described in Example I, comprising 700 parts epoxy resin.

a. 84 parts diethylene triamine (12 parts per hundred parts of epoxy resin in A)

b. 230 parts Versamid 125 (33 parts per hundred parts of epoxy resin in A). This is a polyamid curing agent produced by General Mills of which product the amine number is 270. This curing agent is believed to be a condensation product of dimer acids and diethylene triamine.

c. 230 parts Versamid 140. The same product as shown under (b) but with an amine number of 320.

In all three cases, the coating could not be applied under water. The coating would not adhere to the steel but would tend to slip over the steel when attempting to brush it under water. All of these coatings tended to emulsify in the water, while attempts were made to adhere it to the panel by vigorous brushing.

EXAMPLES V-X

In Table B below, amine curing agents of general formula

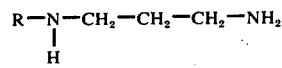

are shown, which can successfully be used in the system of the invention when the preparation of the coating mixture has been done as disclosed in Example I.

TABLE B

| Ex. | Amine-Curing Agent | R in General Formula |
|---|---|---|
| V | N-cocopropylene diamine* (Duomeen C, Armour) | $C_{14}H_{27}-$ |
| VI | N-tallowpropylene diamine (Duomeen T, Armour) | $C_{18}H_{33}-$ $C_{18}H_{35}-$ |
| VII | N-oleylpropylene diamine (Adogen 572, Ashland)** | $C_{18}H_{33}-$ |
| VIII | N-soypropylene diamine | $C_{18}H_{35}-$ $C_{18}H_{31}-$ $C_{18}H_{33}-$ |
| IX | Tall oil fatty acid derived propylene diamine (Adogen 551, Ashland) | $C_{18}H_{31}-$ |
| X | N-Tridecyl propyl etherpropylene (Adogen 582, Ashland) | $C_{13}H_{25}-O-C_3H_6-$ |

*This material known as cocodiamine is derived from the fatty acids in coconut oil (Armour Chemical Co., Chicago)
**Ashland Chemicals, Columbus, Ohio.

The epoxy resin-amine system with the amine curing agents of Table B were tested to evaluate their effectiveness in an underwater clear coating. Clear coatings were used here as a severe test for underwater application and adhesion. Pigmented coatings appear to apply and adhere better than clear coatings. It is realized that the amine-epoxy ratio was not stoichiometric in every case, but the ratio is fairly close to stoichiometric. Besides this, it appears that masonry surfaces are generally easier to coat underwater than steel surfaces.

To test the systems in which the amine curing agents of Examples V - X were used, a clear coating was prepared consisting of:

3 parts by weight amine from each of Examples V - X and 1 part epoxy resin with an equivalent weight per epoxy-unit of 180 and a viscosity between 7,000 and 10,000 centipoise.

These components were mixed in a glass flask, heated to about 100° C. for one hour and cooled overnight or for about 15 hours. Then this liquid or semi-crystalline reaction product was mixed with a liquid epoxy resin in a ratio of 1.5 parts of liquid epoxy resin to 1.0 parts of the reaction product between the above mentioned amine-epoxy resin mixture. The obtained coating system was brushed under water on steel to obtain a coating thickness of 2 – 5 mils. The results are summarized in Table C.

TABLE C

| Used Amine Curing Agent of Example | Amine | Appearance of the Coating |
|---|---|---|
| V | N-coco-propylene diamine | Semi-crystalline, thick, fairly good cure |
| VI | N-tallow propylene diamine | Hazy, fairly good cure |
| VII | N-oleyl propylene | Clear smooth film, very good cure |
| VIII | N-soy-propylene diamine | Hazy film, very good cure |
| IX | N-Tall oil fatty acid propylene diamine | Clear film, very good cure |
| X | N-Tridecyl propyl etherpropylene | Very clear light colored film, very very good cure |

N-oleyl propylene diamine, N-tall oil fatty acid propylene diamine and tridecyl propyl ether propylene diamine appear to be very good amines here. Others were not as good, but did perform.

In Table D, the results are shown of tests comparable to those given in Table C, but in these test conventional amine curing agents have been used. The coating did not give the desired results, because the composition emulsified.

TABLE D

| Example | Amine Curing Agent Used in the Clear Coating Test | Results |
|---|---|---|
| XI | Diethylene triamine (12 parts per hundred) | Would not coat steel but only emulsified in water. |
| XII | Versamid 125 (33 parts per hundred) | Would not coat steel but only emulsified in water. |
| XIII | Versamid 140 | Would not coat steel but only emulsified in water. |

It has been found that small amounts of water sensitive amine curing agents and accelerators can be added to the fatty amine-epoxy adducts without degrading the film-forming underwater or on wet surfaces. This appears from Example XIV.

EXAMPLE XIV 2 parts liquid epoxy resin as in the preceeding example were thoroughly mixed with 1 part of a mixture comprising:
70 parts N-tall oil fatty acid derived propylene diamine
14 parts epoxy resin (as used in Example I)
10 parts diethylene triamine
6 parts DMP 30, 2,4,6-tri(dimethylaminomethylphenol).

The preparation of the coating was the same as for Example I and the applying of the coating to steel underwater was the same as in the Example III. The obtained coated steel had the desired properties of a high strength coating with good results underwater.

EXAMPLE XV

In this example a higher molecular weight epoxy resin was used to make an amine curing agent.
Therefore a mixture was prepared of
70 parts N-oleyl propylene diamine and
30 parts Araldite 7071 (CIBA) which is a semi-solid resin, and the equivalent weight per epoxy unit is 575.
This mixture was heated for 2 hours at cooled to room temperature, and then used as an epoxy curing agent as indicated in Examples V – X. It appeared to perform even better than the same type of curing agent made with lower molecular weight epoxy resign.

EXAMPLE XVI

The same type of curing system as described in Example I–III, V–X and XIV can be used to formulate a caulking compound. It turns out that the diamine-epoxy adducts can be formulated with certain low viscosity epoxy resins to give very tough, adherent, rather flexible solid resins which when pigmented, made a very satisfactory caulk for using on damp or wet masonry.

For such a caulking mixture the following formulation can be used:
Part A consisting of Araldite 506, low molecular weight epoxy resin containing 11% butyl glycidyl ether,
Part B: 500 parts of a reaction product between 70% N-oleyl propylene diamine and 30% Araldite 6005, higher molecular weight epoxy-resin,
500 parts calcium carbonate extender pigment
90 parts asbestos fiber,
90 parts titanium dioxide pigment.

Part B was blended together in a mixer until smooth, after which 80 parts A were mixed with 180 parts B. This amount of B contains about the following proportions: 76 parts of such reaction product between the diamine and the epoxy resin, 76 parts of the calcium carbonate, 14 parts asbestos fiber and 14 parts titanium dioxide pigment. This was a thick white liquid which was easy to pump from a caulking gun, but when put in place in a crack, it did not sag. It started to harden in about 5 hours, and was a rubbery white solid overnight. It had a very good adhesion to wet concrete.

EXAMPLE XVII 100 grams of an epoxy resin, with an equivalent weight per epoxy-unit of about 175, and 62 parts N-oleyl proplene diamine as described in Example XV are stirred together. After an induction period of about 30 minutes this coating was applied under water and was found to apply in a satisfactory manner.

EXAMPLE XVIII

A mixture forming part A is ground on a paint mill, and this mixture consists of:
250 parts rutile titanium dioxide
300 parts ground silica extender
680 parts epoxy resin, as used in Example I.
The reaction product of:
2 parts N-tall oil fatty acid derived propylene diamine as used in Example XVII
1 part epoxy resin, as used in Example I has a viscosity of about 180 stokes, a Gardner color of 5 to 6 and is a clear transparent liquid.

85 parts of this reaction product are blended with 15 parts of propylene glycol, and this mixture is the adduct, part B. Instead of propylene glycol another glycol can also be used such as ethylene, butylene or hexylene glycol.

The above components are mixed in a ratio of 1.5 parts A and 1 part B.

This made an especially good underwater coating for rolling with an ordinary paint roller or brushing if desired.

In preparing the coating composition using the epoxy resin/amine-epoxy resin adduct aqueous system, a high "oil", or water-insoluble component, content oil-in-water emulsion is made by charging to the bowl of a planetary beater or mixer an emulsifier and water of the amounts and emulsifier types shown in the Tables below. Agitation is started and is continued until the emulsifier and water are thoroughly beaten together. Then the resin is added to the bowl and beating is continued. The resin, if not in the liquid state, it heated to the liquid state before adding to the bowl. This beating forms the thick high-oil-content oil-in-water emulsion. Typically the composition of the emulsion is 85% oil (i.e. resin or amine-adduct), 5% emulsifier and 10% water.

The thick emulsion so formed contains oil or resin particles typically of about one micron diameter; and it is then diluted to the desired amount with water. The dilution can be readily carried out by withdrawing the thick emulsion from the emulsifying or beating zone to a dilution zone. In using the planetary beater, this can be done continuously by withdrawing the thick emulsion through a hole in the bottom of the bowl while adding fresh starting materials at the top of the bowl, the withdrawn thick emulsion being conveyed to a second mixer where there is added the desired amount of water, e.g. to form an emulsion containing from about 1% to about 80% of the resin or amine-resin adduct. The second mixture is gently stirred to form the more dilute emulsion. An emulsion of the epoxy resin so made is mixed with a similarly prepared emulsion (but without emulsifer) of the amine-epoxy resin adduct to give the desired coating composition. The two emulsions can be mixed together in the diluted state, or in the thick state and in the latter event the admixed emulsion is then diluted. The two components can be emulsified together in the proper proportions if to be used as a coating within a short time and before reaction has been substantially effected. However, for best results the two dilute emulsions are separately prepared and then admixed to form the coating emulsion.

In Table E there are shown the composition and some characteristics of epoxy resin aqueous emulsions of oil-in-water type made by the above process steps:

TABLE E

| Mix No. | Composition | | | | Final Emulsion | | |
|---|---|---|---|---|---|---|---|
| | Epoxy Resin | Emulsifier | Initial Water | Dilution Water | Non-volatile by weight | Particle size: Microns | Phys. Props. |
| 1. | Araldite 6005 1000 g. | Retzanol NP-300 50 g. | 135 g. | 335 g. | 68% (65% Araldite 6005) | 0.5 | pH 6.8 visc. about 300 cP. |
| 2. | Epon 828 Wt. per epoxy: 185–192 visc. 10,000 to 16,000 cP (Shell Chemical Co.) 300 g. | CO 990 15 g. | 25 g. | 275 g. | 51% | 1–1.5 | pH 5.5 low viscosity |
| 3. | Araldite 6040 Wt. per epoxy: 233–278 semi-solid Warmed to 35° C. 500 g. | Retzanol NP-300 25 g. | 80 g. (hot) T=80° C. | 170 g. (hot) T=80° C. | 68% (65% Araldite 6040) | 1, aver. | pH 6.65 visc. about 300 cP |
| 4. | "Advanced" epoxy resin made by reacting by wt.88% Araldite 9402 (liquid epoxy resin) and 12% bisphenol-A, Wt. per epoxy:360 Solid at room temp. Heat to 70° C. to make | Retzanol NP-150: 20 g. and Retzanol NP-500: 20 g. | 110 g. Hot water T=80° C. | 580 g. Hot water T=80° C. | 65% | <1, aver. | pH 6.0 visc. 200–300 cP |

TABLE E-continued

| Mix No. | Composition | | | | Final Emulsion | | |
|---|---|---|---|---|---|---|---|
| | Epoxy Resin | Emulsifier | Initial Water | Dilution Water | Non-volatile by weight | Particle size: Microns | Phys. Props. |
| | emulsion | | | | | | |

None of the epoxy groups appear to be destroyed when emulsified at a slightly acid pH and using a non-ionic emulsifier, by the method of this invention.

In Table F there are shown the compositions and some physical characteristics of fatty amine-epoxy resin adducts in water emulsions, according to this invention, and made by the above-described process:

TABLE F

| Mix No. | Composition | | | | Emulsion Properties | | |
|---|---|---|---|---|---|---|---|
| | Amine Resin (Parts by Wt.) | Emulsifier | Initial Water | Dilution Water | Non-volatile by weight | Particle size: Microns | Phys. Props. |
| 5. | Reaction product of 2 parts tall oil fatty acid derived diamine, 1 part Araldite 6005 visc.: 180 poise Color: Gardner 5; Amine No.: 215 500 g. | Retzanol NP-300 25 g. | 265 g. | 20 g. | 55% | 0.5–1.0 | pH: 10.2 visc.: 500 cP |
| 6. | Reaction product (amine resin) of Example XXII 1000 g. | Retzanol NP-300 50 g. | 400 g. | none | 68.5% | 2–3 | pH 10.9 |
| 7. | Reaction product of 60 parts oleyldiamine 30 parts Araldite 6005, 10 parts diethylene triamine 500 g. | Retzanol NP-300 25 g. | 150 g. | 385 g. | 50% | 0.5–5 | |
| 8. | Reaction product of 1 part tall oil fatty acid derived diamine, 1 part Araldite 7071 (solid epoxy resin) of Wt. 450–530 per epoxy. Product is semi-solid & emulsified warm (T=50° C.) 500 g. | Retzanol NP-500 25 g. | 280 g. | none | 65% | 2–5 | pH 10.2 very thick emulsion |

TABLE F-continued

| Mix No. | Composition | | | | Emulsion Properties | | |
|---|---|---|---|---|---|---|---|
| | Amine Resin (Parts by Wt.) | Emulsifier | Initial Water | Dilution Water | Non-volatile by weight | Particle size: Microns | Phys. Props. |
| 9. | Reaction product of 2 parts tridecyl propyl ether diamine, 1 part Araldite 6005; Color: Gardner 4; Amine No.: 210 Visc.: 500 poise 500 g. | Retzanol NP-500 | 265 g. | 20 g. | 55% | 1 | pH 10.4 slightly viscous emulsion |

All of the emulsions of Table F. Are suitable for use in making the aqueous coating compositions of this invention by admixing the resin emulsion and the amine component emulsion to provide epoxy resin and the amine-epoxy resin adduct in substantially stoichiometric amounts. The coating is then applied to a dry, damp or wet surface which can be of metal, wood, cement, concrete, plaster or the like. The mixed emulsions cure within about 3 to 20 hours, whether in emulsion form or after coating onto a substrate.

In making a typical pigmented aqueous emulsion coating according to this embodiment of the invention, a pigment paste is prepared by mixing in a high speed mixer 235 lbs. of water, 10 lbs. of Igepal CO-630 (a nonionic emulsifier), 1 lb. of hydroxyethyl/cellulose and 250 lbs. of rutile (titanium dioxide). A small amount of a defoaming agent can be added if desired, and the temperature should not be allowed to exceed 110° F. The pigment is suitable dispersed in the mixer until a particle fineness of NS 8 is obtained. Then, 280 lbs. of Mix No. 5 of Table F are added to the paste and gentle mixed for a few minutes, after which there are added 280 lbs. of Mix No. 4 of Table E and the whole stirred to make a uniform mix. The coating is then applied, by means of a brush or roller or by spraying, onto almost any type of substrate, dry or moist. The resultant film becomes set in about 7 hours and becomes very hard after curing overnight at room temperature. The cured film has a pleasing low gloss. No sagging of the film was noticed.

Table G shows the results of attemping to form aqueous emulsions of water-sensitive polyamines or polyamid amines, which form only gelatinous or jelly-like masses and are unsuitable for use in this embodiment of the invention:

TABLE G

| Parts by Weight | | | Emulsion Properties |
|---|---|---|---|
| Amine Resin | Emulsifier | Water | Non-volatile |
| Versamid 115 Amine value 85-95 200 g. | 10 g. CO 990 | 1200g. | 15% Gelatenous mass. Semi-transparent. Particles of emulsified material could not be detected with microscope. |
| Versamid 140 Amine value 320 200 g. of Versamid 140 & 5 g. acetic acid | 10 g. CO 990 | 800 g. | 20% Semi-transparent jelly-like mass. Acetic acid was added in an attempt to neutralize some of the amine to make it more emulsifiable. This was not effective. |

As the above examples indicate, the epoxy resin may be any polyepoxide having more than one vic-epoxy group and containing no atoms except carbon, hydrogen, oxygen and, in some cases, chlorine. Wide variety in physical properties is feasible.

I claim:
1. A method of coating a substrate with a wet or moist surface including a surface immersed under water, comprising the steps of:
   a. thoroughly mixing, to provide a non-aqueous coating composition:
      A. an epoxy resin consisting of a polyepoxide having a plurality of vic-epoxy groups and containing only members of the group consisting of carbon, hydrogen, oxygen and chlorine, and
      B. a stoichiometric amount of an amine curing agent which is substantially insoluble in water and not water-sensitive and chosen from the group consisting of
         1. an amine of the formula

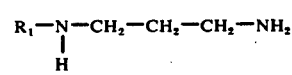

where $R_1$ is chosen from the group consisting of ether radicals of which one of the alkyl or alkylene radicals has at least eight carbon atoms, and 2. a condensation product of a small proportion of a polyepoxide having a plurality of vic-epoxy groups and containing only members of the group consisting of C, H, O, and Cl, and a large proportion of a fatty amine of the formula:

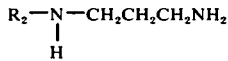

where $R_2$ is chosen from the group consisting of alkyl radicals having at least eight carbon atoms and ether radicals of which one of the alkyl or alkylene radicals has at least eight carbon atoms, b. applying said coating composition to said surface, and c. leaving alone said surface with the applied coating composition until it cures.

2. The method of claim 1 wherein the curing takes a time between 1 and 15 hours at room temperature for the coating to start hardening and between 5 and 20 hours at room temperature to cure substantially fully.

3. The method of claim 1 in which the amine curing agent (B) consists of a condensation product of 3 parts by weight of an amine with said formula $R_2$—NH—CH$_2$—CH$_2$—CH$_2$—NH$_2$, and 1 part by weight of epoxy resin, with an equivalent weight per epoxy-unit of about 180.

4. The method of claim 3 wherein the curing agent (B) is prepared by heating a mixture of the amine and epoxy resin for about one hour to about 100° C. and cooling the resulting product for about 15 hours.

5. The method of claim 1 wherein the amine curing agent (B) is a condensation product of 70 parts by weight of N-oleyl propylene diamine and 30 parts by weight of an epoxy resin with an average molecular weight of about 575.

6. The method of claim 5 wherein the curing agent (B) is prepared by heating a mixture of the amine and epoxy resin for two hours at 100° C., and then cooling the resulting product to room temperature.

7. The method of claim 1 wherein the amine curing agent (B) comprises a condensation product of
2 parts N-tall oil fatty acid derived propylene diamine wherein R is a mixture of $C_{18}H_{33}$ and $C_{18}H_{31}$, and
1 part said polyepoxide.

8. The method of claim 1 wherein part (A) consists of:
80 parts of weight of a low-molecular weight epoxy resin containing 11% butyl glycidyl ether, and wherein part (B) consists of 180 parts by weight of
76 parts of the reaction product of 70% N-oleyl propylene diamine and 30% polyepoxide,
76 parts calcium carbonate,
14 parts asbestos fiber, and
14 parts titanium dioxide pigment.

9. The method of claim 1 in which the polyepoxide of part (A) is mixed with a glycol before adding the amine curing agent (B) in order to obtain a faster curing process and a better brushing resistance.

10. The method of claim 9, in which the glycol is propylene glycol.

11. A method as in claim 1 wherein said amine curing agent is chosen from the group consisting of: N-tall oil fatty acid-propylene diamine, N-oleyl propylene diamine, and tridecylpropylether propylene amine.

12. A method of caulking wet or damp masonry, comprising
blending 80 parts (A) comprising a low molecular weight polyepoxide having at least two vic-epoxy groups and containing only members of the group consisting of C, H, O, and Cl, with
100 parts (B) consisting essentially of
500 parts of a reaction product between
70% N-oleyl propylene diamine and 30% said polyepoxide,
500 parts calcium carbonate,
90 parts asbestos fiber,
90 parts titanium dioxide pigment,
and forcing the mixture before it cures into the areas to be caulked.

13. A method of coating a structural material with a wet or moist surface including a surface immersed under water, comprising the steps of:
a. thoroughly mixing, to provide a non-aqueous coating composition:
A. an epoxy resin consisting of a polyepoxide having a plurality of vic-epoxy groups and containing only members of the group consisting of carbon, hydrogen, oxygen and chlorine, and
B. a stoichiometric amount of an amine curing agent which is substantially insoluble in water and not water-sensitive and chosen from the group consisting of
1. an amine of the formula

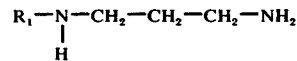

where $R_1$ is chosen from the group consisting of ether radicals of which one of the alkyl or alkylene radicals has at least eight carbon atoms, and 2. a condensation product of a small proportion of a polyepoxide having a plurality of vic-epoxy groups and containing only members of the group consisting of C, H, O, and Cl, and a large proportion of a fatty amine of the formula:

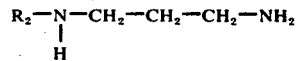

where $R_2$ is chosen from the group consisting of alkyl radicals having at least eight carbon atoms and ether radicals of which one of the alkyl or alkylene radicals has at least eight carbon atoms, b. applying said coating composition to said surface, and c. leaving alone said surface with the applied coating composition until it cures.

14. A method of coating a structural material chosen from the group consisting of metal, wood, masonry, brick, porous ceramic building brick and concrete and having a wet or moist surface including a surface immersed under water, comprising the steps of:
a. thoroughly mixing, to provide a non-aqueous coating composition:

A. an epoxy resin consisting of a polyepoxide having a plurality of vic-epoxy groups and containing only members of the group consisting of carbon, hydrogen, oxygen and chlorine, and
B. a stoichiometric amount of an amine curing agent which is substantially insoluble in water and not water-sensitive and chosen from the group consisting of
   1. an amine of the formula

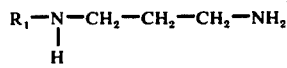

where $R_1$ is chosen from the group consisting of ether radicals of which one of the alkyl or alkylene radicals has at least eight carbon atoms, and 2. a condensation product of a small proportion of a polyepoxide having a plurality of vic-epoxy groups and containing only members of the group consisting of C, H, O, and Cl, and a large proportion of a fatty amine of the formula:

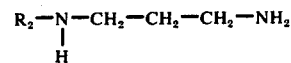

where $R_2$ is chosen from the group consisting of alkyl radicals having at least eight carbon atoms and ether radicals of which one of the alkyl or alkylene radicals has at least eight carbon atoms,
b. applying said coating composition to said surface, and
c. leaving alone said surface with the applied coating composition until it cures.

* * * * *